US006866288B2

(12) United States Patent

Martin

(10) Patent No.: US 6,866,288 B2

(45) Date of Patent: Mar. 15, 2005

(54) CONVERTIBLE WHEELCHAIR AND SEPARATE LIFT MODULE FOR CONNECTING TO AND ELEVATING THE WHEELCHAIR

(76) Inventor: Willis Martin, 3136 Sunset Ave., Rocky Mount, NC (US) 27804-3660

( * ) Notice: Subject to any disclaimer, the term of this patent is extended or adjusted under 35 U.S.C. 154(b) by 34 days.

(21) Appl. No.: 10/120,041

(22) Filed: Apr. 10, 2002

(65) Prior Publication Data

US 2003/0193166 A1 Oct. 16, 2003

(51) Int. Cl.[7] .................................................. B62B 7/00

(52) U.S. Cl. .................... 280/647; 280/648; 280/250.1; 280/304.1; 280/643; 280/47.41; 297/DIG. 4; 414/678; 414/680; 414/754; 414/778; 414/921

(58) Field of Search ................................ 280/647, 648, 280/657, 250.1, 304.1, 643, 47.33, 42, 638, 658, 47.38, 47.41; 254/7 C, 7 R; 297/DIG. 4, 68, 90, 91, 71, 64, 80, 85; 414/678, 680, 754, 778, 921

(56) References Cited

U.S. PATENT DOCUMENTS

| | | | | | |
|---|---|---|---|---|---|
| 3,379,450 | A | * | 4/1968 | Emerson | 280/657 |
| 3,962,737 | A | * | 6/1976 | James | 5/83.1 |
| 4,079,990 | A | * | 3/1978 | McMunn et al. | 297/69 |
| 4,119,342 | A | * | 10/1978 | Jones | 297/80 |
| 4,592,695 | A | * | 6/1986 | McConnell | 414/678 |
| 4,830,567 | A | * | 5/1989 | Rachman | 414/678 |
| 4,949,408 | A | * | 8/1990 | Trkla | 5/86.1 |
| 4,997,200 | A | * | 3/1991 | Earls | 280/648 |
| 5,050,899 | A | * | 9/1991 | Stensby | 280/250.1 |
| 5,112,076 | A | * | 5/1992 | Wilson | 280/657 |
| 5,179,745 | A | * | 1/1993 | Hebert et al. | 5/620 |
| 5,292,144 | A | * | 3/1994 | Sosnoff | 280/304.1 |
| 5,333,887 | A | * | 8/1994 | Luther | 280/250.1 |
| 5,520,403 | A | * | 5/1996 | Bergstrom et al. | 280/250.1 |
| 5,601,302 | A | * | 2/1997 | Beard et al. | 280/250.1 |
| 5,669,620 | A | * | 9/1997 | Robbins | 280/250.1 |
| 6,015,256 | A | * | 1/2000 | Mesa et al. | 414/678 |
| 6,203,044 | B1 | * | 3/2001 | Conaway et al. | 280/304.1 |
| 6,247,718 | B1 | * | 6/2001 | Gobbers et al. | 280/304.1 |
| 6,478,529 | B1 | * | 11/2002 | Willey et al. | 414/678 |
| 6,499,163 | B1 | * | 12/2002 | Stensby | 5/618 |
| 6,565,112 | B2 | * | 5/2003 | Hanson et al. | 280/650 |
| 2002/0149168 | A1 | * | 10/2002 | Brown | 280/250.1 |

FOREIGN PATENT DOCUMENTS

| | | | | |
|---|---|---|---|---|
| GB | 2159794 | * | 12/1985 | B66F/11/00 |

* cited by examiner

*Primary Examiner*—Christopher P. Ellis
*Assistant Examiner*—J. Allen Shriver
(74) *Attorney, Agent, or Firm*—Coats & Bennett, P.L.L.C.

(57) ABSTRACT

A convertible wheelchair is provided along with a separable lift module for engaging and elevating the convertible wheelchair to a selected elevation. A coupling assembly is operative associated with the lift module and adapted to extend therefrom to where the coupling assembly attaches to the convertible wheelchair. In one embodiment, the coupling assembly comprises a three-point attachment that results in the wheelchair being connected to the coupling assembly and hence the separable lift system at three points. Once coupled to the lift system, the convertible wheelchair, with a patient supported therein, can be raised to a selected elevation. Thereafter, the wheelchair can be converted from a chair configuration to any one of several examination configurations.

43 Claims, 6 Drawing Sheets

CONVERTIBLE WHEELCHAIR AND SEPARATE LIFT MODULE FOR CONNECTING TO AND ELEVATING THE WHEELCHAIR

FIELD OF INVENTION

The present invention relates to the combination of a convertible wheelchair and a separable and movable lift for the wheelchair. The combination provides a system that enables many medical examinations and procedures to be undertaken without the need of transferring a patient from a wheelchair to an examining table.

BACKGROUND OF INVENTION

In the conduct of medical or other examinations and therapy for individuals who require a wheelchair for mobility, there arises a need to have the person being examined or treated in a recumbent position and located at a convenient height for the practitioner. While various forms of examination tables are well known, the process of transferring a person from a wheelchair to an examining table can be both uncomfortable and dangerous for the person. Moreover, locations in which examination or treatment of such individuals is desirable, such as private homes, rest homes, and other convalescent or long term care facilities often do not have available the needed examining table. For both of the foregoing reasons, being able to convert a wheelchair to an examining table and being able to use a separate lift to couple to, and raise and lower the wheelchair while it is occupied by the patient provide significant advantages.

While wheelchairs which may be converted to horizontal surfaces to permit the recumbency of the occupant exist and are well known. While wheelchairs with devices for raising and lowering exist, such known systems have the disadvantage of a lack of flexibility due to the requirement that the raising and lowering means is integral with the wheelchair. For a better appreciation of the state of the art in this area, one is referred to U.S. Pat. Nos. 4,592,695; 5,179,745; 5,060,960; 4,949,408; 4,119,342; 4,407,543; 4,079,990; 5,050,899; 5,333,887; 5,520,403; and 5,209,322. There remains a need for a system in which any one of a number of convertible wheel chairs can be detachably connected to a separable lift which may be moved from on location to another and which may thereby provide the means for examination and therapy of persons without requiring the particular person to be transferred from the wheelchair to an examination chair or table.

SUMMARY OF THE INVENTION

The present invention relates to a wheelchair and lift system comprising a convertible wheelchair and a lift module for engaging and detachably connecting to the wheelchair such that the lift module may elevate the wheelchair above a floor or other underlying surface. In one embodiment of the present invention, the lift module is separate from the convertible wheelchair but is adapted to connect to the wheelchair through one or more connecting points. In one particular embodiment, the lift module is provided with a coupling assembly that connects to the wheelchair at three points. In another specific embodiment, the lift module is provided with a coupling assembly that connects to the wheelchair at four points.

The present invention also entails a method of examining a person or patient confined to a wheelchair. This method includes rolling the convertible wheelchair over the separate lift module and connecting the lift module to the convertible wheelchair. Then, the lift module is actuated, causing the convertible wheelchair and the patient therein to be elevated above the floor or underlying surface. Thereafter, or in some cases prior to lifting, the wheelchair is converted form a chair configuration to one or more examining configurations. In one embodiment of the present invention, the convertible chair can be converted to an examination table while elevated by the lift module.

Other objects and advantages of the present invention will become apparent and obvious from a study of the following description and the accompanying drawings which are merely illustrative of such invention.

DETAILED DESCRIPTION OF THE INVENTION

With further reference to the drawings, the wheelchair and lift system of the present invention is shown therein and indicated generally by the numeral 10. Before discussing the system in detail, it may be noted that the basic system comprises a convertible wheelchair 12, a separate lift module 14, and a coupling assembly 18 for interconnecting the wheelchair 12 with the lift module 14. Wheelchair 12 is adapted to convert from a conventional chair configuration (FIG. 2) to an examination chair or table. In the embodiment illustrated in FIG. 1, the convertible wheelchair 12 will convert from a conventional wheelchair configuration to a generally horizontal examination table. In any event, the convertible wheelchair 12 can be rolled over the lift module 14. Once over the lift module 14, the coupling assembly 18 attached to the lift module 14 can be extended to and coupled to the wheelchair 12. Thereafter, the lift module 14 can be actuated, causing the lift module 14 to lift the wheelchair 12, along with the patient, from an underlying support surface. Once at a selected elevation, the attitude of the person within the wheelchair can be appropriately adjusted by converting the wheelchair 12 to an examination table or simply reclining the back rest of the wheelchair 12 to situate the person therein in a desirable orientation.

Figure 2:
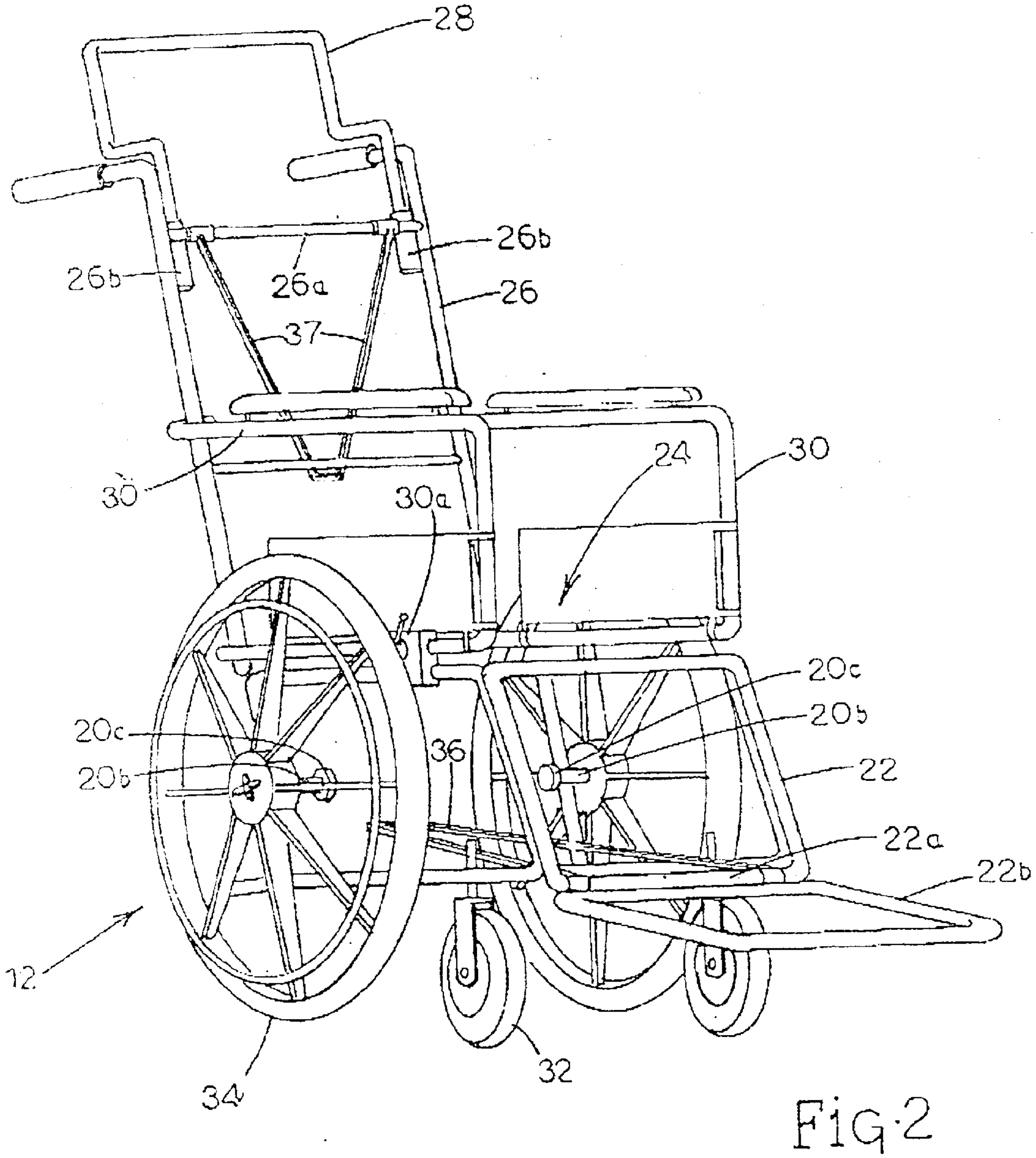
FIG. 2 is a perspective view of the wheelchair.
Figure 4:
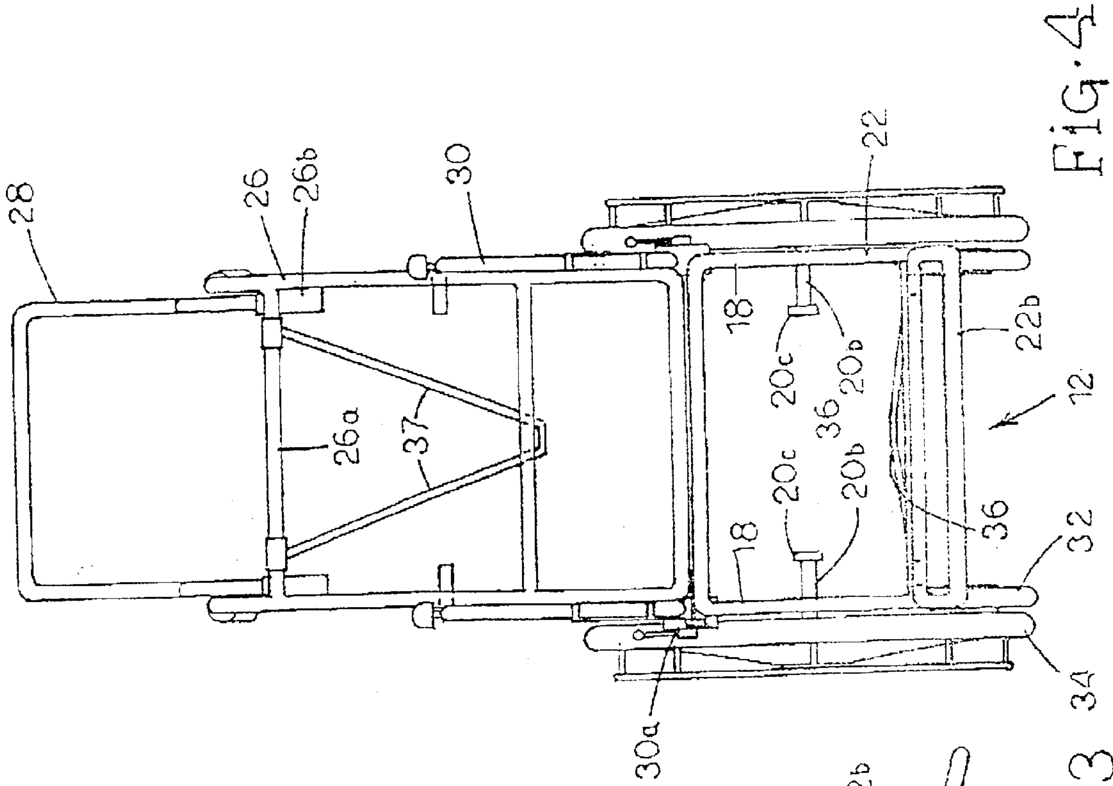
FIG. 4 is a front view of the wheelchair.
Figure 3:
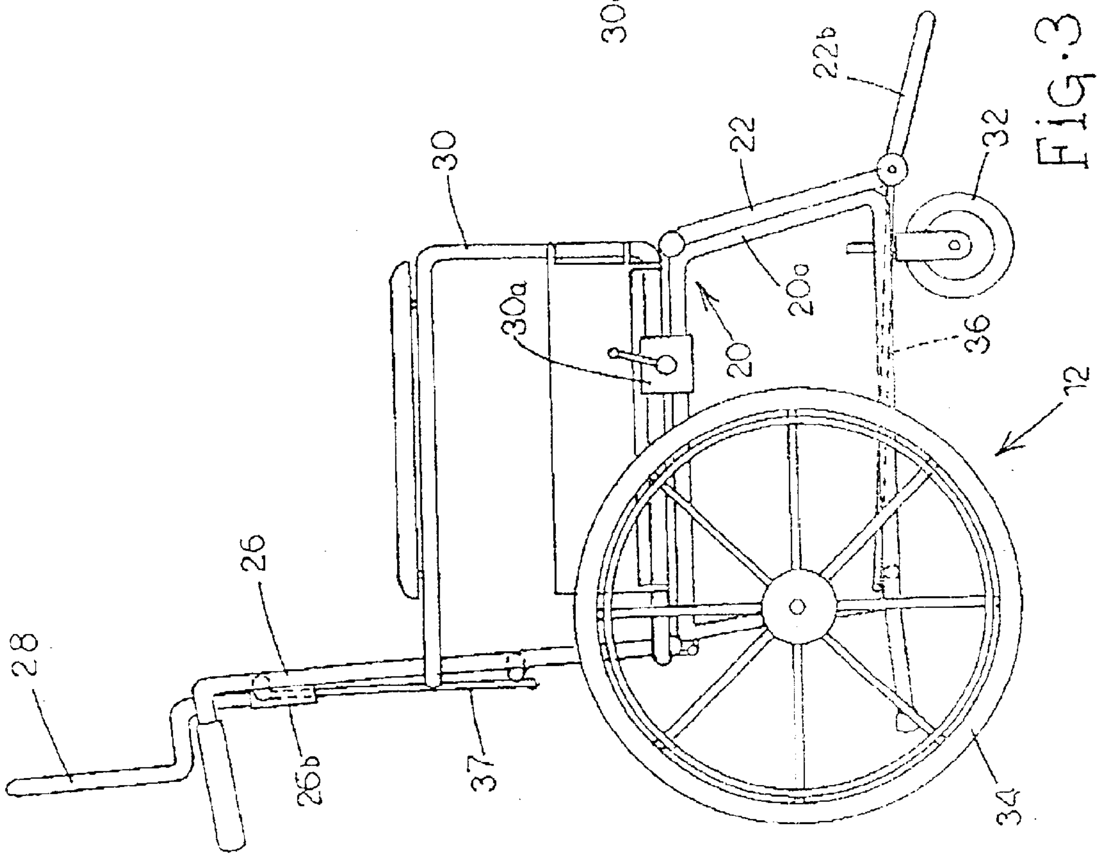
FIG. 3 is a side view of the wheelchair.

Referring specifically now to FIGS. 2, 3 and 4, the wheelchair 12 is schematically shown. As noted above, the wheelchair 12 is a convertible wheelchair inasmuch as the same can be converted from a conventional chair configuration to a table or various other reclining configurations. It should be noted that convertible wheelchairs are known in the art. For example, reference is made to U.S. Pat. No. 4,079,990, the disclosure of which is expressly incorporated herein by reference. With respect to the wheelchair 12 shown in the drawings, in order to better illustrate the frame structure and components of the wheelchair, the upholstered portions of the chair are not particularly shown. However, it is understood that the wheelchair 12 would include various upholstered areas such as is found in conventional wheelchair designs.

The fundamental supporting structure of the wheelchair 24 is comprised of a mainframe 20. Mainframe 20 includes a pair of spaced apart side frames 20*a* that are interconnected together. Each of the side frames 20*a* is of a generally closed rectangular construction. Rear wheels 34 and front casters 32 are conventionally attached to the mainframe 20 and thereby support the mainframe. Rear wheels 34 are adapted to be easily removed from the mainframe by conventional means. This permits easy and direct access to a person or patient supported on the wheelchair when the wheelchair has been converted, for example, to an examination table.

Attached to the mainframe 20 is a seat frame or structure 24. A leg rest 22 is pivotally attached to the mainframe 20 in an area generally above the casters 32. As will be appreciated from the drawings and from subsequent discussions, the leg rest 22 can be pivotally adjusted to assume various positions with respect to the mainframe 20. Typically, the pivot joints interconnecting components such as the leg rest 22 with the mainframe 20 include lockable joints. That is, these joints can include a rotary knob that can be turned so as to lock or release the joint. To secure and lock the leg rest 22 in various positions, conventional locking means are provided to lock the leg rest 22 in various positions with respect to the mainframe 20. To give the leg rest 22 rigidity, the leg rest is provided with a cross member 22*a*. Further, pivotally and lockably attached to the leg rest 22 is a foot rest extension 22*b*.

Pivotally attached to the mainframe 20 in an area generally overlying the rear wheels 34 is a back rest 26. Back rest 26 includes a number of cross members, including cross member 26*a*. As with the leg rest of 22, the back rest of 26 is provided with conventional means to lock the back rest 26 in various positions with respect to the mainframe 20. Further, back rest 26 is adapted to receive a removable head rest 28. The removable head rest 28 includes a pair of terminal ends that are designed to be inserted within sleeves 26*b* mounted to the upper portion of the back rest 26.

Secured to the mainframe 20 just inwardly of the rear wheels 34 are a pair of side frames 30. Each side frame 30 is pivotally attached the mainframe 20 as shown in FIG. 2. When an adjacent rear wheel 34 is removed, a side frame 30 can rotate from an upper vertical position to a lower vertical position. Each side frame is provided with a lockable pivot connector 30*a* that permits the side frame 30 to be pivoted through approximately 180° and locked at any position within that range.

As discussed briefly above, the wheelchair 12 is designed and adapted to be connected to the lift module 14. To accommodate this, the wheelchair 12 is provided with a number of connecting links or connecting points. First, in the embodiment shown in FIGS. 2–4, there is provided a leg rest connecting link 36. Connecting link 36 assumes a generally triangular configuration and is pivotally connected to the cross member 22*a* that extends across the leg rest 22. As seen in FIG. 2, link 36 simply projects rearwardly under the seat 24 when the wheelchair 12 assumes its normal chair configuration. There is also provided a back rest connecting link 37. Back rest connecting link 37 is also of a generally triangular configuration and is pivotally connected to cross member 26*a* of the back rest 26. Both of the connecting links 36 and 37 include terminal end portions that are designed to be readily connected to the coupling assembly 18 extending from the lift module 14.

Finally, the mainframe 20 is provided with a pair of inwardly projecting stubs 20*b*. Stubs 20*b* are of a circular cross section and are secured as cantilever beams projecting inwardly on each side of the side frame members 20*a*. As is appreciated from FIG. 2, each stub 20*b* includes a retaining section 20*c*. As will be appreciated from subsequent portions of the disclosure, stubs 20*a* are instrumental in interconnecting the wheelchair 12 with the lift module 14.

Figure 5:
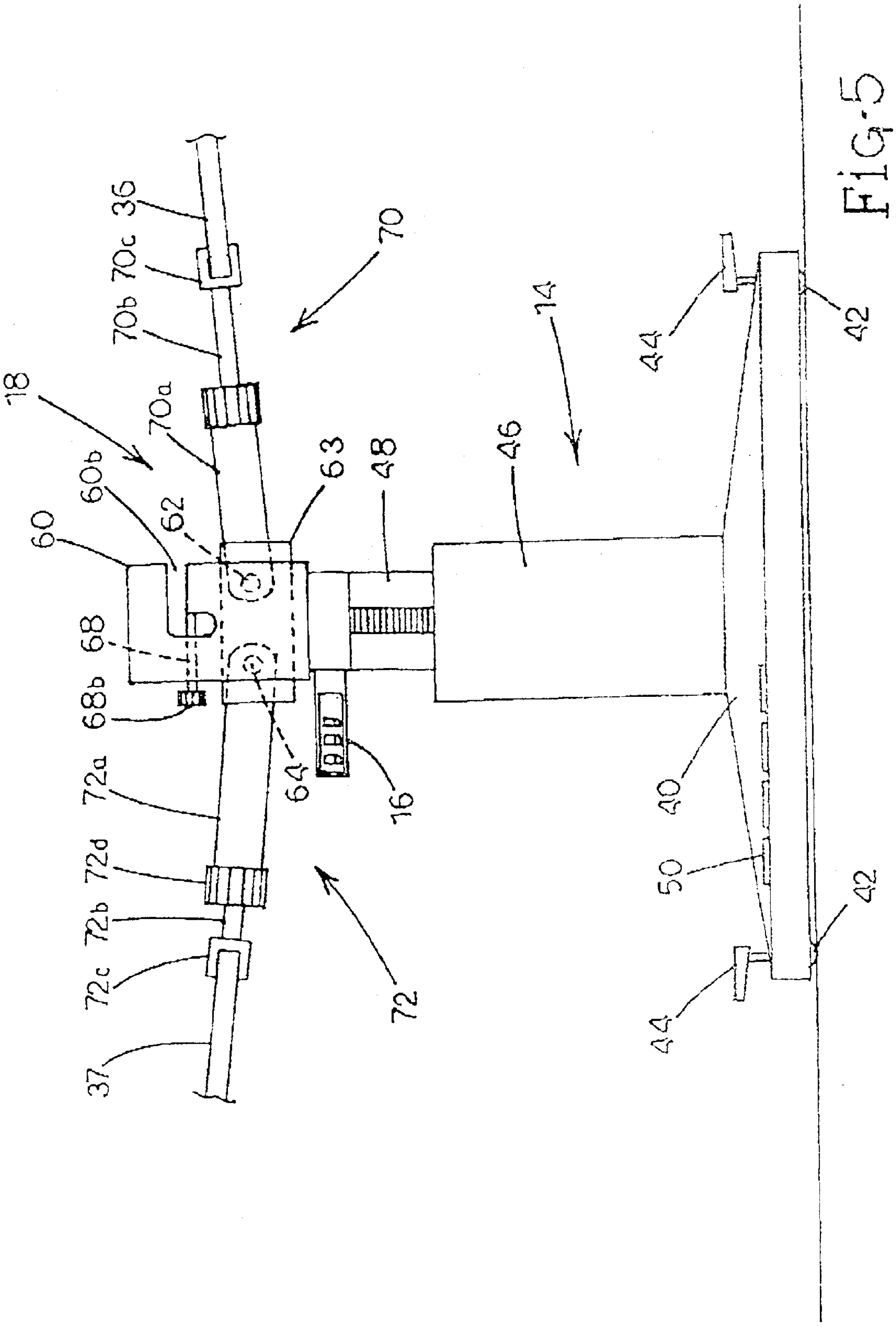
FIG. 5 is a side view of the lift module and coupling assembly.

Turning now to lift module 14 and referring specifically to FIG. 5, it is appreciated that lift module 14 includes a base 40 which is supported by a series of wheels 44 each of which is provided with a wheel retracting lever and lock of a conventional design. Disposed above and supported by base 40 is housing 46 which is of a generally cylindrical design. Disposed interiorly to and extending upward from housing 46 is armature 48. Disposed on the base is foot control 50 which conventionally provides means for controlling the vertical position of armature 48.

Details of the lift module 14 are not dealt with herein because such lifting devices are well known and appreciated by those skilled in the art and are commonly incorporated into chairs and examination tables. For example, such a lifting device is incorporated into an examination table manufactured by Ritter Sybron Corporation of Rochester, N.Y. and referred to as the Ritter "75" table. Basically, the Ritter table and other similar tables are powered by an electric motor, hydraulic system, pneumatic system, or a combination of these.

Figure 1:
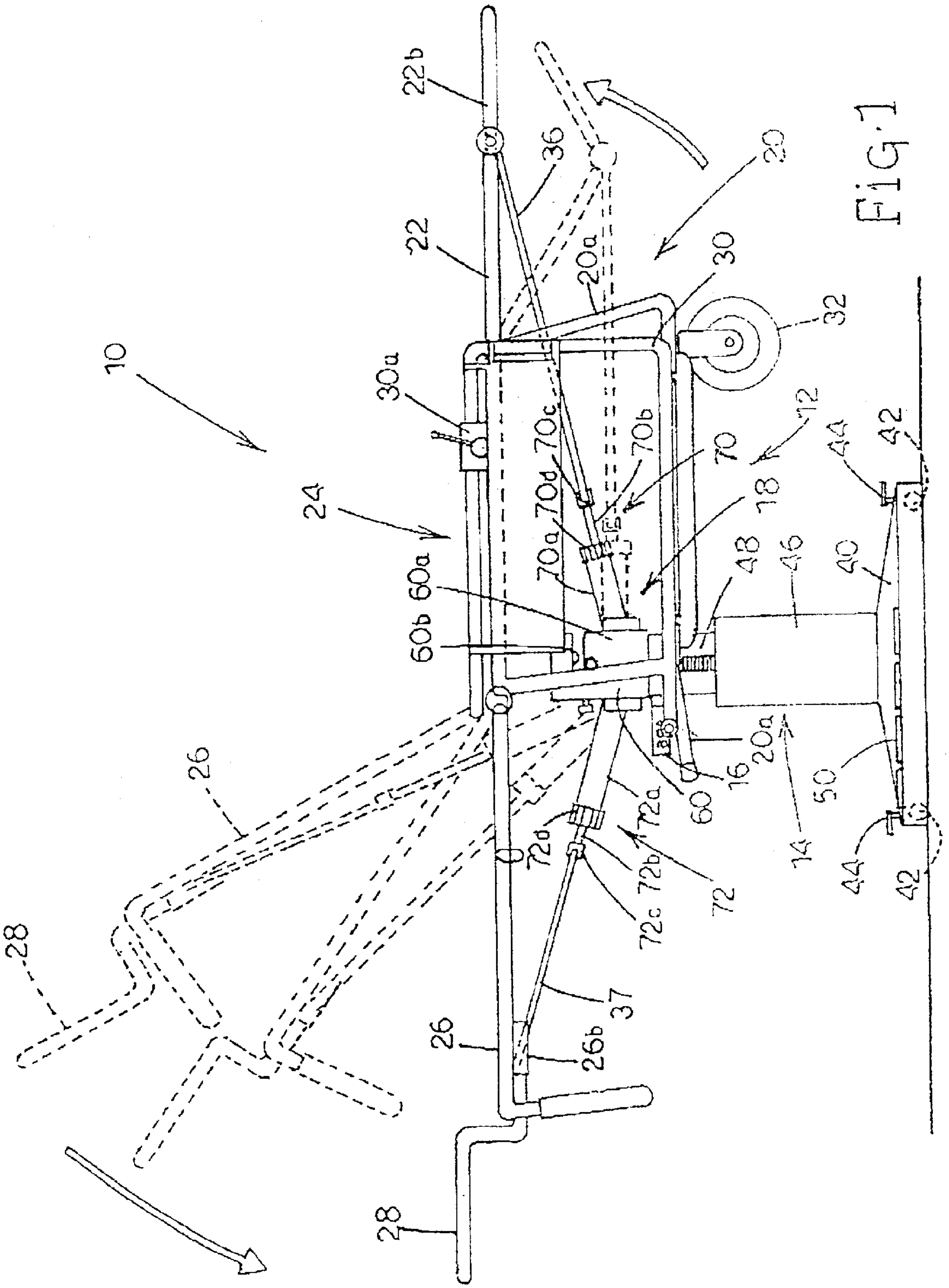
FIG. 1 is a side view of the wheelchair and separable lift system shown with the wheelchair in a table configuration.

As shown in FIGS. 1 and 5, a load sensing and readout device 16 is mounted on the upper end of armature 48 in a manner which permits vertical forces transmitted between the armature and structure disposed upon and above the load sensing and readout device 16 to be sensed and indicated on the readout portion of the device. When the lift module 14 is utilized in a doctor's office, for example, the load sensing and readout device 16 enables the doctor to weigh a patient supported within a wheelchair while coupled to the lift module.

Figure 5A:
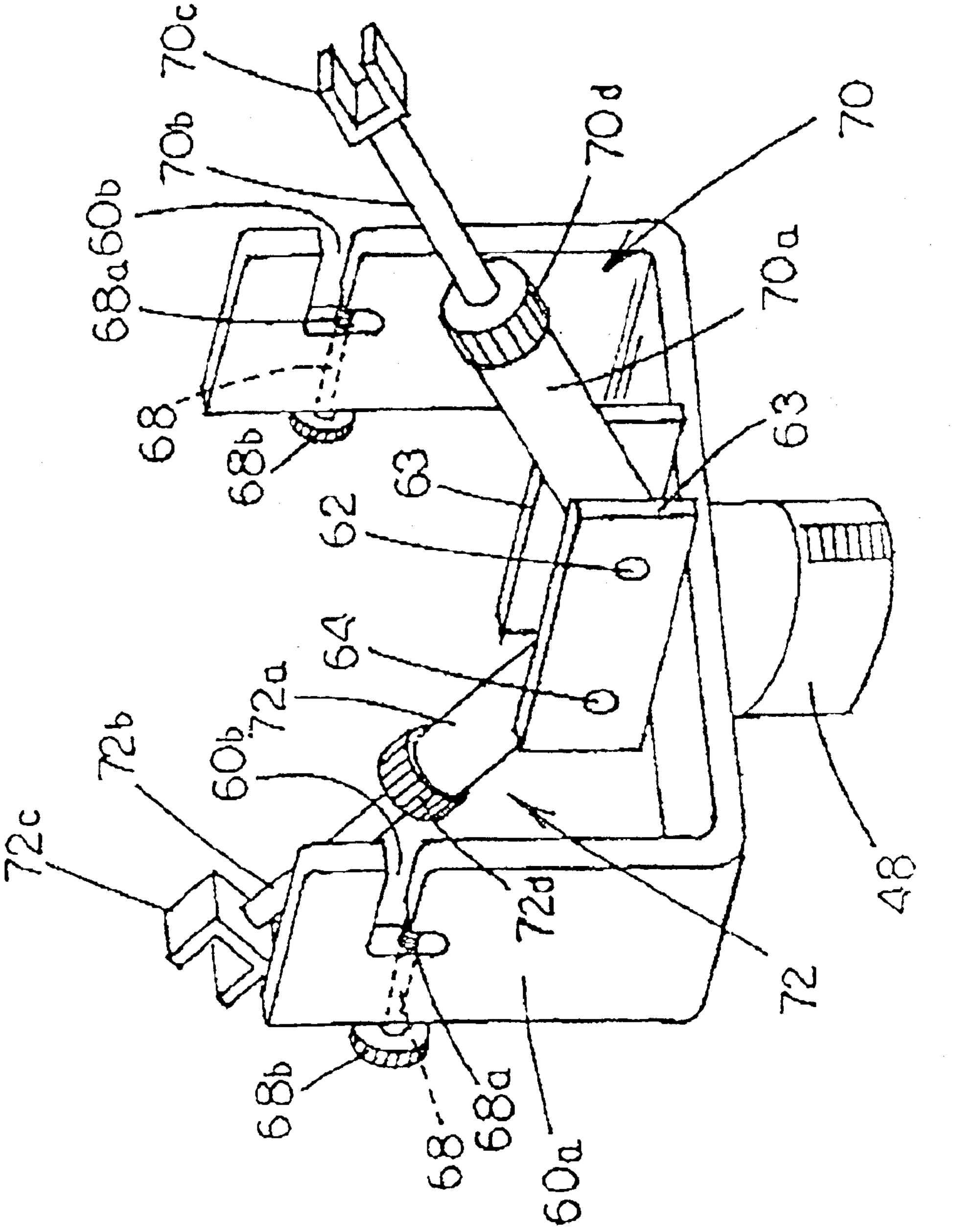
FIG. 5A is a fragmentary perspective view of the coupling assembly of the present invention.

Turning now to the coupling assembly 18 and referring in particular to FIGS. 5 and 5A, coupling assembly 18 includes a base or yoke 60 of a generally "U" shaped construction and having side portions 60*a*. The coupling assembly is secured atop load sensing and readout device 16. Formed in each side portion is a stub receiving slot 60*b*. The stub receiving slot comprises a generally horizontal opening extending from one vertical edge of each side portion. At a point somewhat interior to the same vertical edge of the side portion, the slot is abruptly deepened, providing a recessed area. As will be described later, stub receiving slot 60*b* is instrumental in the interconnection of the coupling assembly 18 with the wheelchair 12. Horizontally disposed slightly above and adjacent to receiving slots 60*b* are locking screw holes 68*a* which are interiorly threaded in a conventional manner and which receive stub retainer shafts 68. Secured to the outer end of stub retainer shafts 68 are knobs 68*a*. As will be appreciated from the description provided later, stub retainer shafts 68 are instrumental in securing stubs 20*b* to side portions 60*a*.

Continuing to refer to FIG. 5, disposed interior to the "U" of yoke 60 and centrally between side portions 60*a* is dual clevis mount 63. Included in clevis mount 63 are front adjustable link mounting points 62 and rear adjustable link mounting points 64. A front adjustable link 70 is pivotably attached by a pinned connection to front adjustable link mounting points 62, and rear adjustable link 72 is pivotably attached by a pinned connection to front adjustable link mounting points 64. Adjustable links 70 and 72 are of conventional design and include link housings 70*a* and 72*a* and link armatures 70*b* and 72*b*. These adjustable links may take the form of hydraulic, pneumatic, or electrical linear actuators. As with the embodiment shown in FIG. 5, adjustable links 70 and 72 may also take the form of telescoping assemblies with built-in locking devices 70*d* and 72*d* to fix each link at any particular length within its designed range. Disposed at the distal end of the armature of each adjustable link are link connectors 70*c* and 72*c*, of a conventional design and each configured to rigidly and separably attach to one of the connecting links 36 or 37 associated with the wheelchair 24.

Because the lift module 14 is provided with wheels 42, it follows that the entire lift module can be moved from one location to another location. Prior to using, the lever and lock 44 associated with each wheel is actuated causing the wheels 42 to be retracted. This lowers the base 40 onto an underlying support surface which supports and stabilizes the lift module 14. Alternatively, the support surface can be adapted to include a structure that would couple directly to the base 40 of the lift module. This structure would positively retain and stabilize the lift module 14.

To position the lift module 14 to receive and elevate the wheelchair 24, the armature 48 of the lift module is adjusted using the foot control 50 to a position where the stub receiving slots 60*b* are horizontally aligned with the stubs 20*b* of the wheelchair 24. Stub retainer shafts 68 are retracted so that the deepened ends of the stub receiving slots 60*b* are unobstructed.

Wheelchair 12, with occupant (not shown), is then caused to move horizontally towards lift system 14 such that stubs 20*b* engage stub receiving slots 60*b*. Movement of wheelchair 12 continues until stubs 20*b* reach the deepened ends of slots 60*b* at which point the horizontal movement of the wheelchair is stopped. To secure stubs 20*b* in slots 60*b*, armature 48 is caused to move upward sufficiently to cause stubs 20*b* to rest entirely within the deepened areas of slots 60*b*. Using knobs 68*a*, stub retainer shafts 68 are positioned so that they span the deepened area of slots 60*b* and secured stubs 20*b* from uplift that may be caused by side loads or tilting moments.

As can be appreciated from a study of FIGS. 1 and 5, armature 70*b* of front adjustable link 70 is adjusted in length as required and is connected to legrest lift connecting link 36 using connector 70*c*. Similarly, armature 72*b* of rear adjustable link 72 is adjusted in length as required and is connected to backrest connecting link 37 using link connector 72*c*. These connections provide that legrest connecting link 36 and backrest connecting link 37 function as rigid extensions of armatures 70*b* and 72*b*, respectively. The pivotable connections between footrest 22*b* and legrest 22, legrest 22 and mainframe 20, and main frame 20 and backrest 26 remain locked to maintain the wheelchair in the chair configuration. Using foot control 50 to control the vertical movement of armature 48, wheelchair 12 is then elevated to the desired height. After attaining the desired height for the wheelchair, either or both of the rear wheels 34 are removed and either or both of sidearms 30 are unlocked and pivoted outwardly and then downwardly such that they are disposed outside main frame 20.

The process of converting the wheelchair to a table then follows. First, while keeping the pivotable connection between main frame 20 and backrest 26 locked, the pivotable connection between legrest 22 and main frame 20 is released. Front adjustable link 70 is then unlocked and extended, thereby causing legrest 22 to rotate in a counterclockwise fashion, as viewed in FIG. 1. Upon attaining a horizontal position of legrest 22, the pivotable connection between legrest 22 and main frame 20 is locked. The pivotable connection between footrest 22*b* and legrest 22 may them be unlocked, the footrest positioned horizontally, and the connection relocked. In preparation for adjusting backrest 26 in a similar fashion, headrest 28 is removed from backrest 26, rotated 180 degrees about the vertical, and reattached to backrest 26. The pivotable connection between backrest 26 and main frame 20 is then released. Rear adjustable link 72 is then unlocked and extended, thereby causing backrest 26 to rotate in a counterclockwise fashion, as viewed in FIG. 1. Upon attaining a horizontal position of backrest 26, the pivotable connection between backrest 26 and main frame 20 is locked. As can be appreciated particularly from FIG. 1, the foregoing adjustments render the wheelchair 12 in a table configuration. As can be further appreciated by one of ordinary skill in the art, other configurations can be produced by separately adjusting, one at a time, the orientations of legrest 22 and backrest 26 generally following the above procedures.

The steps described above are retraced in reverse order to reconfigure the wheelchair 24 to a chair configuration. Once the wheelchair 24 has been reconfigured to a chair configuration, the wheelchair 24 can be lowered to the floor or underlying support structure, and thereafter the wheelchair can be detached from the lift module 14.

Figure 6:
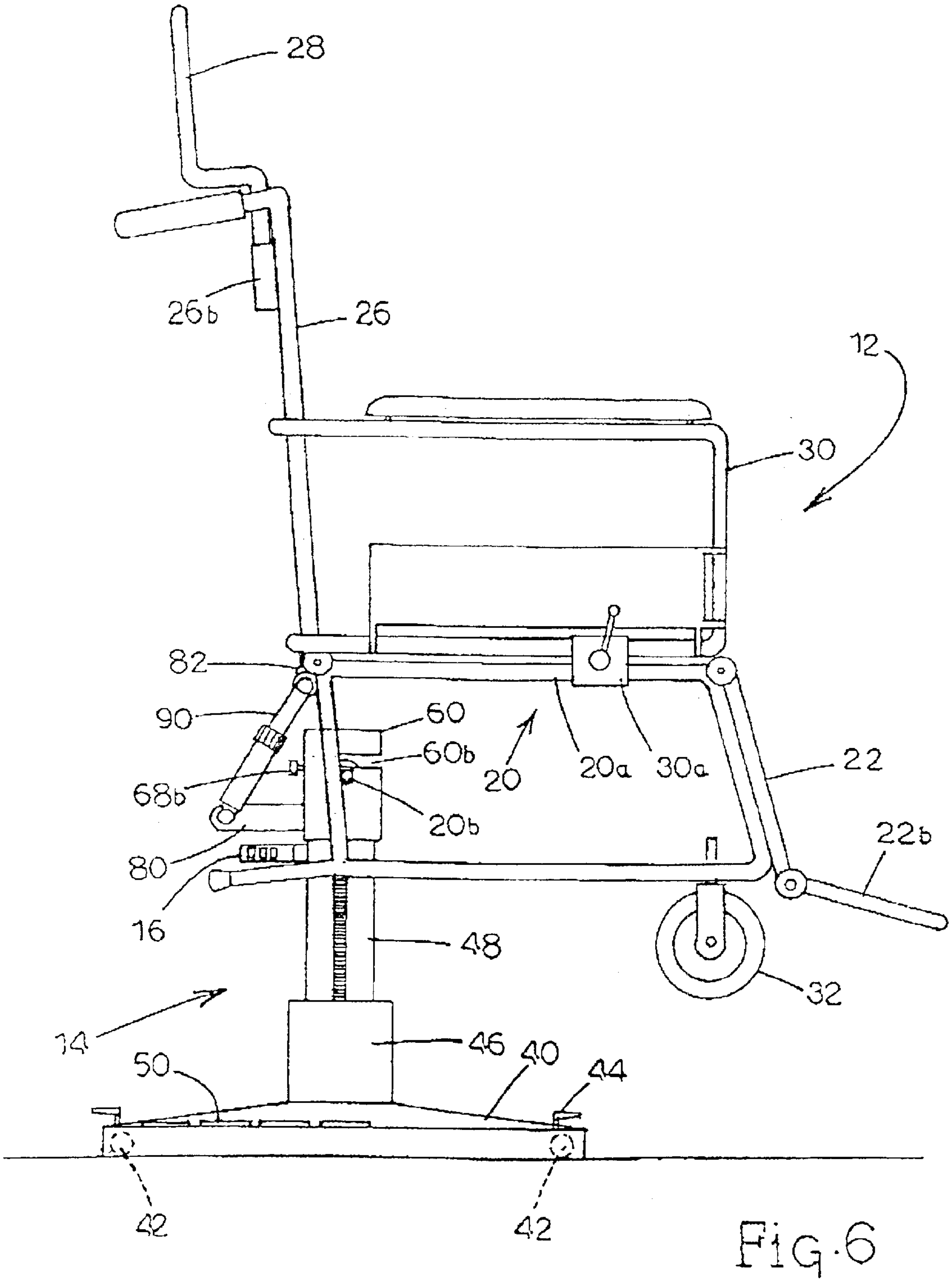
FIG. 6 is a side elevational view of the convertible wheelchair, with the rear wheels removed, and lift module and illustrates an alternative manner of coupling the wheelchair to the lift module.

Turning now to FIG. 6, an alternate embodiment of the present invention is shown therein. In this alternate embodiment the structure and operation of the lift module 14 remains the same and further the basic structure of the wheelchair 12 remains the same as described before. However, in this embodiment, the coupling assembly 18 is designed to couple directly to the mainframe 20 of the wheelchair 24. In particular, the stubs 20*b* couple to the base or yokes 60 in the same way as discussed above and as illustrated in FIG. 1. However, in the alternate design of FIG. 6, the coupling assembly 18 is provided with a clevis 80 that extends rearwardly from the base or yoke 60. A single connecting link 90 is interconnected between the clevis 80 and a connecting clevis 82 on the mainframe 20 of the wheelchair 24. The connecting link 90 includes and extendable link 92*a* that enables the connecting link as a whole to be adjustably connected between the clevis 80 and the connecting clevis 82 on the mainframe 20. Once the coupling assembly 18 is appropriately connected to the wheelchair 24, the lift module 14 can be actuated, causing the wheelchair 24 to be elevated as shown in FIG. 6. At this point, the backrest 26 and the leg rest 22 can be adjusted in the same manner described above.

The present invention has numerous uses and advantages. Seriously disabled patients confined to a wheelchair can be examined in a doctor's office without having to be removed from the wheelchair and placed on a conventional examination table. Likewise, the system of the present invention has utility in nursing homes and rest homes where patients have to be routinely examined by doctors or attending staff. Further, the present invention can be utilized in transferring a disabled patient from a wheelchair to a bed, whether it be in a hospital, nursing home, rest home or other medical care facility. A system such as that described herein is particularly useful in cases where patients have very delicate and fragile skin that is susceptible to bruising and tearing. In the end, the present system will enable these patients to be examined and even moved from a wheelchair to a bed with minimum handling.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A convertible wheelchair and separate lift module for connecting to and raising and lowering the wheelchair comprising:

a. the convertible wheelchair being convertible from a chair configuration to a configuration where a portion of the chair assumes a generally horizontal position;

b. the separate lift module including a lift; and c. a coupling assembly associated with the lift module for detachably connecting to the convertible wheel chair such that when the wheelchair is coupled to the separable lift module through the coupling assembly, the wheelchair may be elevated from an underlying support surface and converted to a configuration other than a chair configuration.

2. The system of claim 1 wherein the wheelchair includes backrest, seat, and legrest segments which are pivotably-interconnected and supported by a main frame and which are alternatively lockable in a configuration of a chair or in a configuration of a table.

3. The system of claim 1 wherein the wheelchair includes a headrest adapted to be detachably secured to the wheelchair.

4. The system of claim 1 wherein the wheelchair includes at least one detachably mounted wheel for enabling access to a patient within the wheelchair when the patient and wheelchair have been elevated to a position for examination.

5. The system of claim 1 wherein the wheelchair includes an adjustable side arm that may be repositioned.

6. The system of claim 1 wherein the wheelchair includes at least one connecting pin adapted to connect to the coupling assembly.

7. The system of claim 1 wherein the lift module is movable and can be moved from one location to another.

8. The system of claim 1 wherein the lift module includes a series of wheels that in one mode permits the lift module to move from one location to another and in another mode retracts to generally stabilize the lift module.

9. The system of claim 8 wherein the movable lift module includes a base and an armature which is movable vertically with respect to the base.

10. The system of claim 9 wherein the armature includes a load sensor adapted to register the weight of any contents of the wheelchair.

11. The system of claim 9 wherein the armature supports the coupling assembly.

12. The system of claim 1 wherein the coupling assembly includes a base adapted to connect to the wheelchair.

13. The system of claim 12 wherein the coupling assembly includes at least one adjustable link which is mounted to the base and adapted to connect to the wheelchair.

14. The system of claim 1 wherein the wheelchair includes a backrest, seat, and legrest segments which are pivotably-interconnected and supported by a main frame and which are alternatively lockable in a configuration of a chair or in a configuration of a table and wherein the coupling assembly includes a first adjustable link connectable to the backrest of the wheelchair and a second adjustable link connectable to the legrest of the wheelchair.

15. The system of claim 14 wherein the orientation of the backrest, seat, and legrest segments of the wheelchair is controlled by varying the length of the first and second adjustable links.

16. The system of claim 1 wherein the coupling assembly is adapted to connect to the wheelchair at least at one point.

17. The system of claim 1 wherein the coupling assembly is adapted to connect to the wheelchair at multiple points.

18. The system of claim 1 wherein the wheelchair is provided with a pair of shafts, and wherein the coupling assembly includes a pair of slots for receiving the shafts of the wheelchair.

19. The system of claim 18 wherein the wheelchair includes a mainframe and wherein the shafts are supported and project from the mainframe.

20. The system of claim 19 including a connecting link adapted to extend from the coupling assembly to the wheelchair such that the wheelchair is coupled to the lift module through at least the two shafts and the connected link.

21. The system of claim 20 including a second connecting link connected between the wheelchair and the coupling assembly and wherein one of the connecting links is connected to a movable leg rest associated with the wheelchair and the other connecting link is connected to a moveable backrest associated with the wheelchair.

22. A method of securing a convertible wheelchair to a separate lift system and converting the wheelchair from a chair configuration to a generally horizontal configuration comprising:

a. moving the wheelchair to a position adjacent the lift system;

b. interconnecting the wheelchair to the lift system;

c. raising and lowering the wheelchair via the lift; and d. converting the wheelchair from a chair configuration to a generally horizontal configuration where the wheelchair may be used as a bed or an examination table.

23. The method of claim 22 including moving the wheelchair to a position over the lift system and thereafter coupling the lift system to the wheelchair.

24. The method of claim 23 wherein interconnecting the wheelchair to the lift system includes attaching the lift system to the wheelchair at multiple points.

25. The method of claim 23 wherein there is provided a coupling assembly for interconnecting the wheelchair with the separate lift system and wherein the coupling assembly includes at least one link adapted to be connected to the wheelchair.

26. The method of claim 23 including removing one wheel from the wheelchair in order to gain access to a person supported by the wheelchair.

27. The method of claim 26 further including moving a sidearm of the wheelchair to a position that permits side access to a person supported in the wheelchair.

28. The method of claim 23 wherein a person occupies the wheelchair.

29. The method of claim 23 including sensing the load carried by the wheelchair such that in the case of a person occupying the wheelchair, the person's weight may be determined.

30. The method of claim 22 including examining a patient by supporting the patient in the wheelchair and elevating the wheelchair to an examining position and converting the wheelchair from a chair configuration to a configuration where a backrest associated with the wheelchair is inclined with respect to a mainframe of the wheelchair.

31. The method of claim 30 including removing a wheel from the wheelchair in order that a doctor or other attendant can gain easy access to the patient occupied within the wheelchair.

32. The method of claim 31 including, after the wheel has been removed from the wheelchair, moving a side arm of the wheelchair away from the patient.

33. A method of securing a wheelchair, which is convertible to an examination table, to a separate movable lift system which includes a lift, comprising:

a. moving the lift system to a desired location;

b. positioning the wheelchair over the lift system;

c. coupling the lift system and the wheelchair together;

e. converting the wheelchair to a table; and f. raising the lift and thereby elevating the wheelchair to a desired height.

34. The method of claim 33 wherein the wheelchair includes at least one detachable wheel and wherein the method includes removing at least one wheel from the wheelchair.

35. The method of claim 33 wherein the wheelchair includes at least one movable sidearm and which at least one movable side arm is repositioned.

36. The method of claim 33 wherein a person occupies the wheel chair.

37. The method of claim 33 wherein a coupling assembly is included for coupling the wheelchair to the lift system, and wherein the method further includes extending one or more links from the coupling assembly to a portion of the wheelchair and connecting the one or more links to the wheelchair, and further attaching the wheelchair to the coupling assembly at least at two other points.

38. The method of claim 33 wherein the lift system includes a load sensing device such that the weight of a person occupying the wheelchair can be determined.

39. The convertible wheelchair and separate lift module of claim 1 wherein the wheelchair may assume the generally horizontal position when raised and elevated over the underlying support surface.

40. The method of claim 33 wherein the examination table assumes a generally horizontal position while being supported in an elevated position by the lift system.

41. The convertible wheelchair and separate lift module of claim 1:

a. wherein the wheelchair includes a frame structure;

b. a series of wheels connected to and supporting the frame structure; and c. wherein the coupling assembly attaches to the frame structure of the wheelchair such that when the wheelchair is raised the wheels of the wheelchair are unsupported.

42. The method of claim 22 wherein the wheelchair includes a frame structure and a series of wheels, and wherein the method includes interconnecting the frame structure of the wheelchair to the lift system such that when the wheelchair assumes a raised position the wheels of the wheelchair are unsupported.

43. The method of claim 33 wherein the wheelchair includes a frame structure and a series of wheels connected to the frame structure, and wherein the method includes coupling the lift system to the frame structure of the wheelchair such that when the wheelchair is raised the wheels of the wheelchair are unsupported.

* * * * *